(12) United States Patent
Ulrich

(10) Patent No.: US 7,396,224 B2
(45) Date of Patent: Jul. 8, 2008

(54) CALIBRATING BASKET FOR A CALIBRATING STATION

(75) Inventor: Herbert Ulrich, Emsdetten (DE)

(73) Assignee: Egeplast Werner Strumann GmbH & Co. KG, Greven (DE)

(*) Notice: Subject to any disclaimer, the term of this patent is extended or adjusted under 35 U.S.C. 154(b) by 0 days.

(21) Appl. No.: 11/507,185

(22) Filed: Aug. 21, 2006

(65) Prior Publication Data
US 2007/0003657 A1 Jan. 4, 2007

Related U.S. Application Data

(63) Continuation of application No. PCT/EP2005/001555, filed on Feb. 16, 2005.

(30) Foreign Application Priority Data

Feb. 21, 2004 (DE) .................. 10 2004 088 620

(51) Int. Cl.
*B29C 47/00* (2006.01)

(52) U.S. Cl. ................ 425/326.1; 425/70; 425/71; 425/72.1; 425/182; 425/388

(58) Field of Classification Search ............ 425/71, 425/72.1, 326.1, 182, 388, 70; 264/177.19
See application file for complete search history.

(56) References Cited

U.S. PATENT DOCUMENTS

| | | | | |
|---|---|---|---|---|
| 2,847,036 A | * | 8/1958 | Dow ........................... 138/45 |
| 3,958,913 A | * | 5/1976 | Stangl ......................... 425/445 |
| 6,779,994 B2 | * | 8/2004 | Krumbock et al. ......... 425/72.1 |
| 6,946,094 B2 | * | 9/2005 | Shober ........................ 264/568 |
| 2003/0031743 A1 | * | 2/2003 | Krumbock et al. ............ 425/71 |
| 2006/0034965 A1 | | 2/2006 | Ulrich et al. |
| 2006/0240134 A1 | * | 10/2006 | Stieglitz ..................... 425/325 |

FOREIGN PATENT DOCUMENTS

| | | |
|---|---|---|
| DE | 32 43 140 A1 | 8/1984 |
| DE | 198 43 340 A1 | 4/2000 |
| DE | 198 43 340 C2 | 11/2001 |
| DE | 102 06 276 A1 | 9/2003 |
| DE | 203 20 348 U1 | 8/2004 |
| EP | 1 157 805 A1 | 11/2001 |
| EP | 1 188 541 A2 | 3/2002 |
| GB | 670708 | 4/1952 |

* cited by examiner

*Primary Examiner*—Robert Davis
*Assistant Examiner*—Marla Veronica Ewald
(74) *Attorney, Agent, or Firm*—Laurence A. Greenberg; Werner H. Stemer; Ralph E. Locher

(57) ABSTRACT

A calibration basket is configured for a calibration station disposed in an apparatus for producing plastic tubes. The calibration basket contains calibration tools that are successively disposed at a distance from each other across the circumference of the tube. The calibration tools are embodied as calibration strips that extend in the longitudinal direction of the tube that is to be calibrated, are disposed so as to be adjustable on displacement spindles, and are provided with one respective sliding surface that enters in contact with the tube. Recesses that are connected to discharge ports are embodied in a sliding surface and are provided within the calibration strip. The discharge ports extend in a direction of the longitudinal axis of the calibration strip.

16 Claims, 4 Drawing Sheets

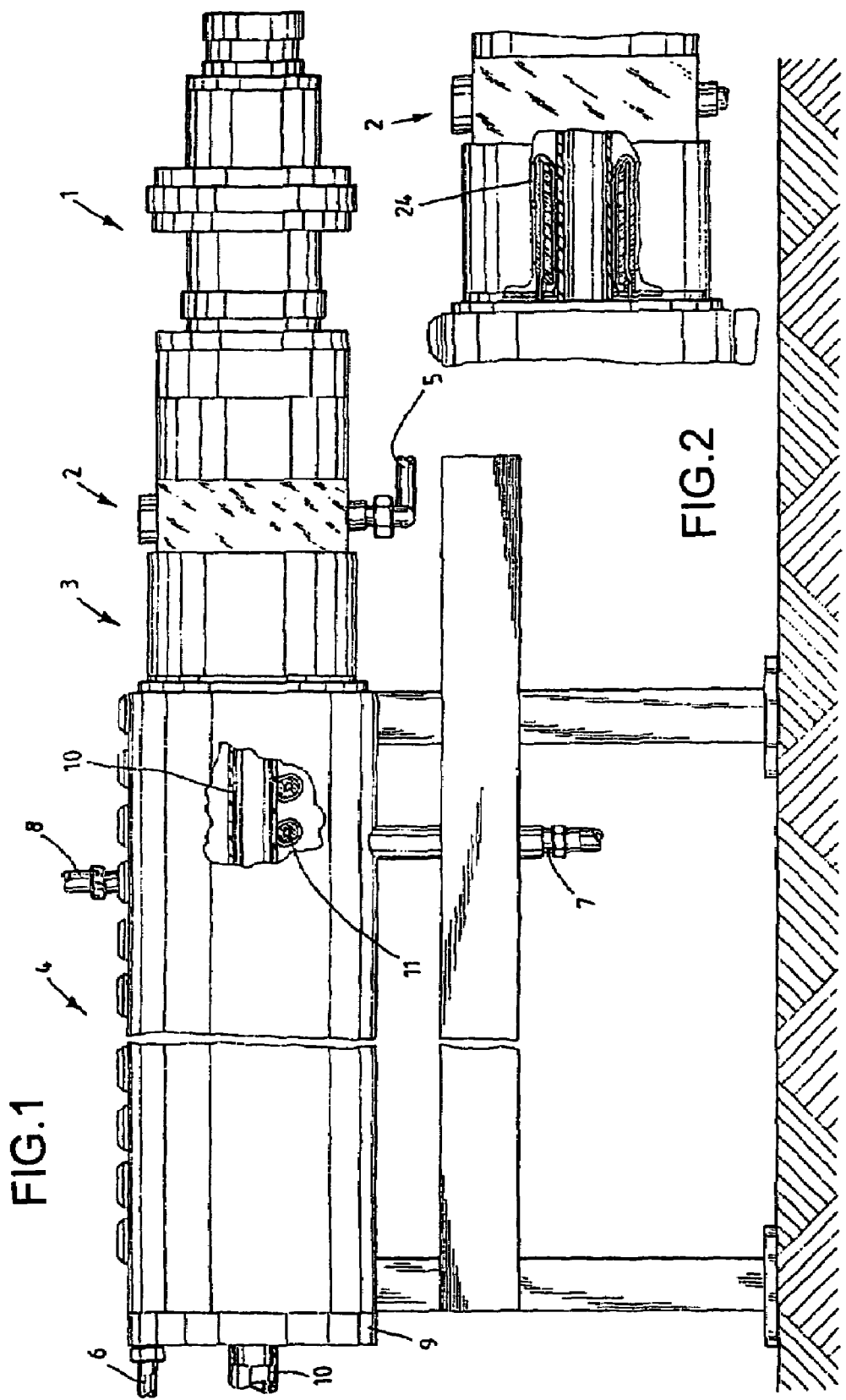

CALIBRATING BASKET FOR A CALIBRATING STATION

CROSS-REFERENCE TO RELATED APPLICATIONS

This is a continuing application, under 35 U.S.C. §120, of copending international application No. PCT/EP2005/001555, filed Feb. 16, 2005, which designated the United States; this application also claims the priority, under 35 U.S.C. §119, of German patent application No. DE 10 2004 008 620.6, filed Feb. 21, 2004; the prior applications are herewith incorporated by reference in their entirety.

BACKGROUND OF THE INVENTION

Field of the Invention

The invention relates to a calibrating basket for a calibrating station in an apparatus for producing plastic pipes. The calibrating basket includes calibrating tools disposed successively at a distance from one another over the circumference of the pipe.

Described in German patent DE 198 43 340 C2 (corresponding to U.S. patent disclosure No. 2006/0034965 A1) is an apparatus for producing plastic pipes that is equipped with a calibrating station. The calibrating tools are formed inside the calibrating station by a multiplicity of segments which are successively disposed in a distributed manner at a distance from one another over the circumference of the pipe to be calibrated, a multiplicity of such segment rings also being provided as viewed in the production direction of the pipe. The precise calibration of the outside diameter of the melt strand and of the already partly cured pipe is effected in the calibrating station by a mechanical, hydraulic or electrical central adjustment.

The production and installation of the multiplicity of segments in the calibrating station is costly in terms of material and is labor-intensive.

In the case of larger pipe diameters, the extrusion speed of the pipe is correspondingly lower, so that the pipe passes through the calibrating station more slowly and thus remains here for a longer period of time, as a result of which deformation could occur between the individual segments.

SUMMARY OF THE INVENTION

It is accordingly an object of the invention to provide a calibrating basket for a calibrating station that overcomes the above-mentioned disadvantages of the prior art devices of this general type, which is substantially more cost-effective than the hitherto known construction and enables the pipe which is to be calibrated to be supported continuously over a longer path as viewed in the production direction of the pipe.

With the foregoing and other objects in view there is provided, in accordance with the invention, a calibrating basket for a calibrating station in an apparatus for producing plastic pipes. The calibrating basket contains adjusting spindles and calibrating tools disposed successively at a distance from one another over a circumference of a pipe. The calibrating tools include calibrating strips extending in a longitudinal direction of the pipe to be calibrated. The calibrating strips are disposed on the adjusting spindles in a radially adjustable manner. The calibrating strips each have a sliding surface with an outlet opening and come into contact with the pipe. The calibrating strips each have recesses formed inside the calibrating strips. The recesses are connected to the outlet opening in the sliding surface and run along a longitudinal axis of a respective calibrating strip.

In other words, it is proposed that, in contrast to the calibrating segments known in the prior art, the calibrating tools are configured as calibrating strips which extend in the longitudinal direction of the pipe to be calibrated. The calibrating strips are disposed on adjusting spindles in a radially adjustable manner and have a respective sliding surface coming into contact with the pipe. Recesses are provided inside the calibrating strip, these recesses are connected to an outlet opening provided in the sliding surface and run in the longitudinal axis of the calibrating strip. Water or vacuum is introduced into the recesses, the water or the vacuum acting through the outlet opening on the outside of the pipe is to be calibrated. In the process, the water acts like a lubricating film and as coolant for the calibrating strip.

A vacuum or a positive pressure can be additionally set in the calibrating station by the calibrating station being connected to the vacuum suction or pressure bell known in the prior art and disposed upstream of the calibrating station.

The vacuum that is set in the calibrating strip is ensured by a connection of the interior of the calibrating strip to the interior of the vacuum calibrating bath following the calibrating station.

The calibrating strips may be additionally provided with water passages which open out in the side walls and likewise direct water onto the top side of the pipe to be calibrated, the water acting as a lubricating film and as a seal. The calibrating basket is rotatably disposed in the calibrating station and performs a rotation about the pipe to be calibrated. The vacuum in the calibrating bath following the calibrating station in the prior art is about 250-500 mbar, and this high vacuum acts in the interior of the calibrating strip via a corresponding access opening, it being possible for the calibrating strip to additionally have a pressure-regulating bore with which this vacuum can now be adjusted in adaptation to the respective material of the plastic pipe.

The vacuum in the suction bell is approximately up to 50 mbar and the positive pressure in the pressure bell can be about 0-100 mbar.

According to the invention, the actual calibrating basket is sealed off from the interior of the vacuum calibrating bath preferably via a diaphragm seal, that is to say via diaphragms which are disposed so as to overlap one another and are preferably sprayed with water, as a result of which the tightness of the diaphragm is further increased.

A respective diaphragm segment is firmly connected to the calibrating strip, and all the diaphragm segments are likewise correspondingly adjusted as a function of the adjustment of the calibrating strip.

Other features which are considered as characteristic for the invention are set forth in the appended claims.

Although the invention is illustrated and described herein as embodied in a calibrating basket for a calibrating station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, side view of an overall production apparatus according to the invention;

FIG. 2 is a diagrammatic, sectional view through a calibrating station;

DESCRIPTION OF THE PREFERRED EMBODIMENTS

Figure 3:
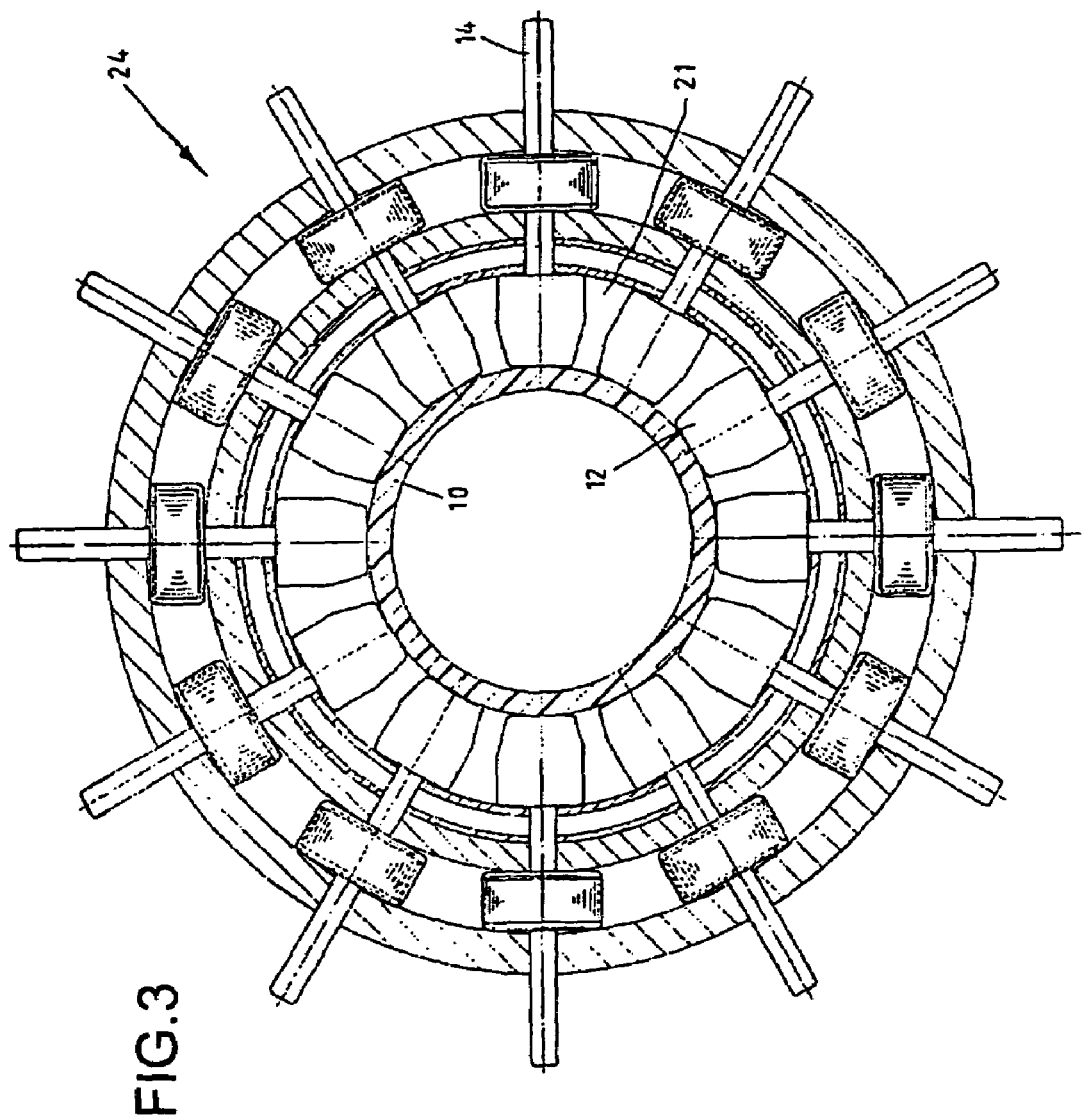
FIG. 3 is diagrammatic, front view showing the calibrating station on a larger scale.

Referring now to the figures of the drawing in detail and first, particularly, to FIG. 1 thereof, there is shown an adjustable die head 1 which, as viewed in a production direction, adjoins a non-illustrated extruder. Adjoining the adjustable die head 1 is a vacuum suction or pressure bell 2, which is equipped with a vacuum or pressure connection 5 and in which measuring devices are provided which, as a function of the desired pipe outside diameter, set the vacuum or pressure prevailing in the bell 2, so that a tubular melt flow is set to a desired outside diameter, i.e. is sucked up or forced in. Pre-cooling of the melt strand is already effected in the vacuum suction or the pressure bell 2, and a precise pipe wall thickness can also be set in the bell 2 in conjunction with the adjustable die head 1. It being possible for the pipe wall thickness to be varied as a function of the outside diameter of the pipe.

Adjoining the vacuum suction or pressure bell 2 is a calibrating station 3, in which a calibrating basket 24 is rotatably disposed. Here, precise calibrating of the outside diameter of the melt strand and of the already partly cured pipe 10 is effected by a mechanical central adjustment, it being possible to use the calibrating station 3 for all suitable plastics. A plurality of sizes, even with different wall thicknesses, can be set in this calibrating station 3.

In an adjoining vacuum calibrating bath 4 as viewed in the production direction, the plastic pipe is then cooled and cured by spray water, following in the production direction, a water feed 6 and a water discharge 7 being discernable in the drawing. Furthermore, a vacuum connection 8 adjoins the vacuum calibrating bath 4, and a pipe 10 located in the vacuum calibrating bath 4 runs over supporting rollers 11, which may also be designated as calibrating rollers and can be set to the desired pipe diameter. A surface of the pipe 10 is relatively hard and the pipe 10 leaves the vacuum calibrating bath 4 through a vacuum seal 9, which either sets itself automatically to the pipe diameter or is set as a function of the set pipe dimensions in the calibrating station 3 and/or in the vacuum calibrating bath 4. Forming rollers may be disposed in the vacuum seal 9, these forming rollers being actuated hydraulically or by mechanical springs, it being possible at the same time for water for lubricating and sealing to be directed here into the passage of the pipe.

FIG. 3 shows, on a larger scale, a calibrating basket 24 located in the calibrating station 3. Here, calibrating strips 12 are disposed on adjusting spindles 14, it being possible for the adjustment of the calibrating strips 12 to be effected in a motor-operated manner, hydraulically or even manually. The calibrating strips 12 are disposed in an annular space 21, which is under vacuum or positive pressure owing to the fact that the annular space 21 is open toward an interior of the suction or pressure bell 2. The vacuum prevailing in the bell 2 or the pressure prevailing here also prevails in the interior of the annular space 21 of the calibrating basket 24.

The interior of the calibrating basket 24 is closed off toward the vacuum calibrating bath 4 by a diaphragm seal, which will be explained in more detail below with reference to FIG. 5.

Figure 4:
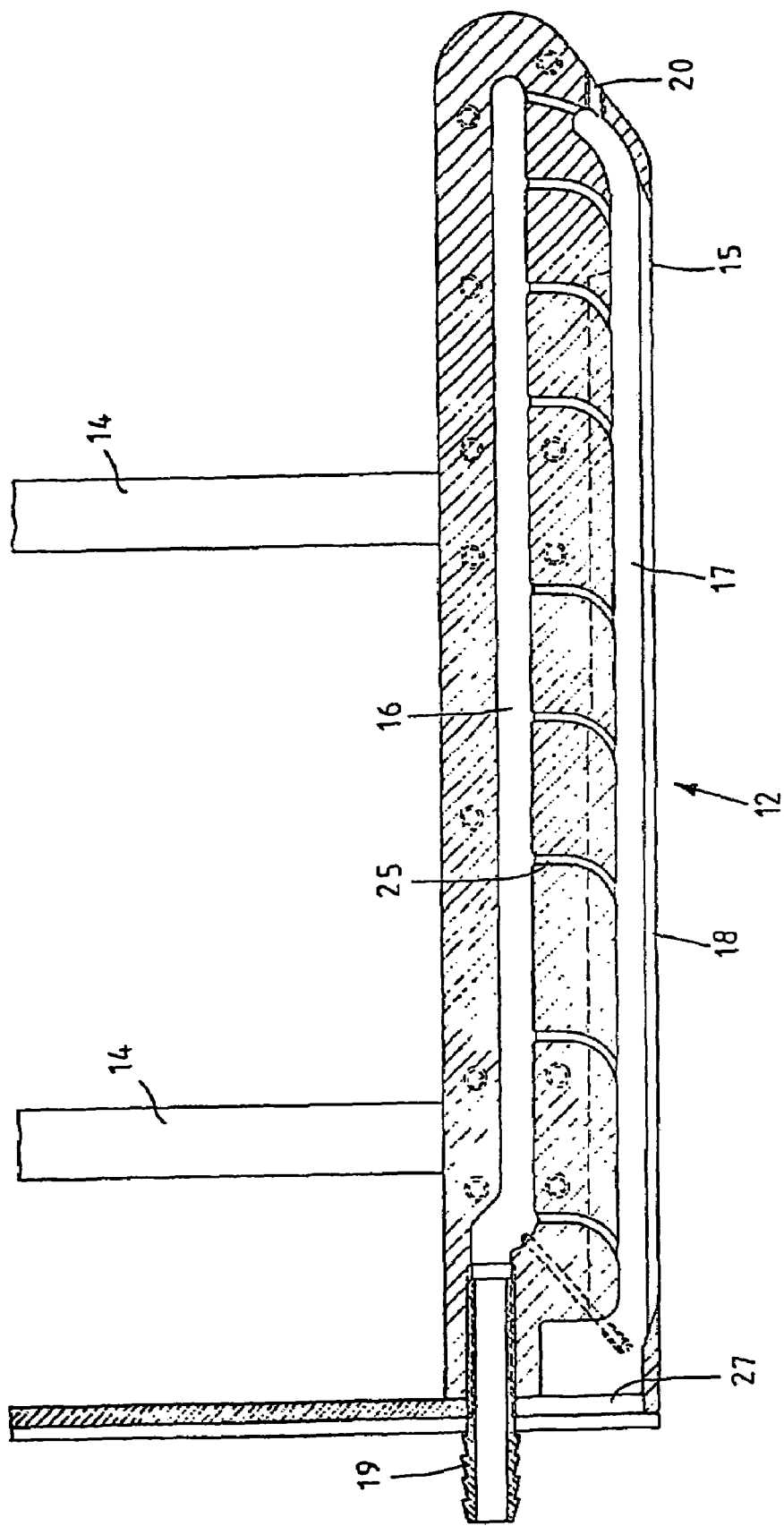
FIG. 4 is a diagrammatic, section view of a calibrating strip, likewise on a larger scale.

As shown in FIG. 4, the calibrating strips 12 are of elongated configuration and have two elongated recesses 16, 17 in their interior and a sliding surface 15 on their underside.

Connected to the recess 16 disposed in the interior of the calibrating strip 12 is a water feed 19, which on the one hand provides for water cooling of the calibrating strip 12, but on the other hand also applies a water film to the pipe 10 to be calibrated owing to the fact that passages 25 are made in the calibrating strip 12, the passages 25 providing a connection between the recess 16 and the recess 17. In this way, the water fed at the water feed 19 is fed to the top side of the pipe 10 by an aperture 18 being disposed in the sliding surface 15, the aperture 18 being configured as a continuous slot in the embodiment shown in FIG. 4, but may just as easily consist of a multiplicity of successive bores or the like.

Furthermore, the calibrating strip 12 is provided with an access opening 27 for the vacuum prevailing in the vacuum calibrating bath 4, this vacuum also being located in the recess 17 and it being possible for it to discharge together with the water through the outlet opening 18 onto the surface of the pipe 10. In order to regulate the vacuum, a pressure-regulating bore 20 which provides a connection to the interior of the recess 17 may be provided in the calibrating strip.

As already explained with reference to FIG. 3, each calibrating strip 12 is carried by two adjusting spindles 14.

The calibrating strips 12 themselves are preferably configured to be split in two as viewed in the longitudinal direction, so that the corresponding bores and openings can be easily incorporated. The split configuration as viewed in the longitudinal axis of the calibrating strip 12 is shown more clearly in FIG. 5, a dividing line 30 illustrating this split in the longitudinal axis.

Figure 5:
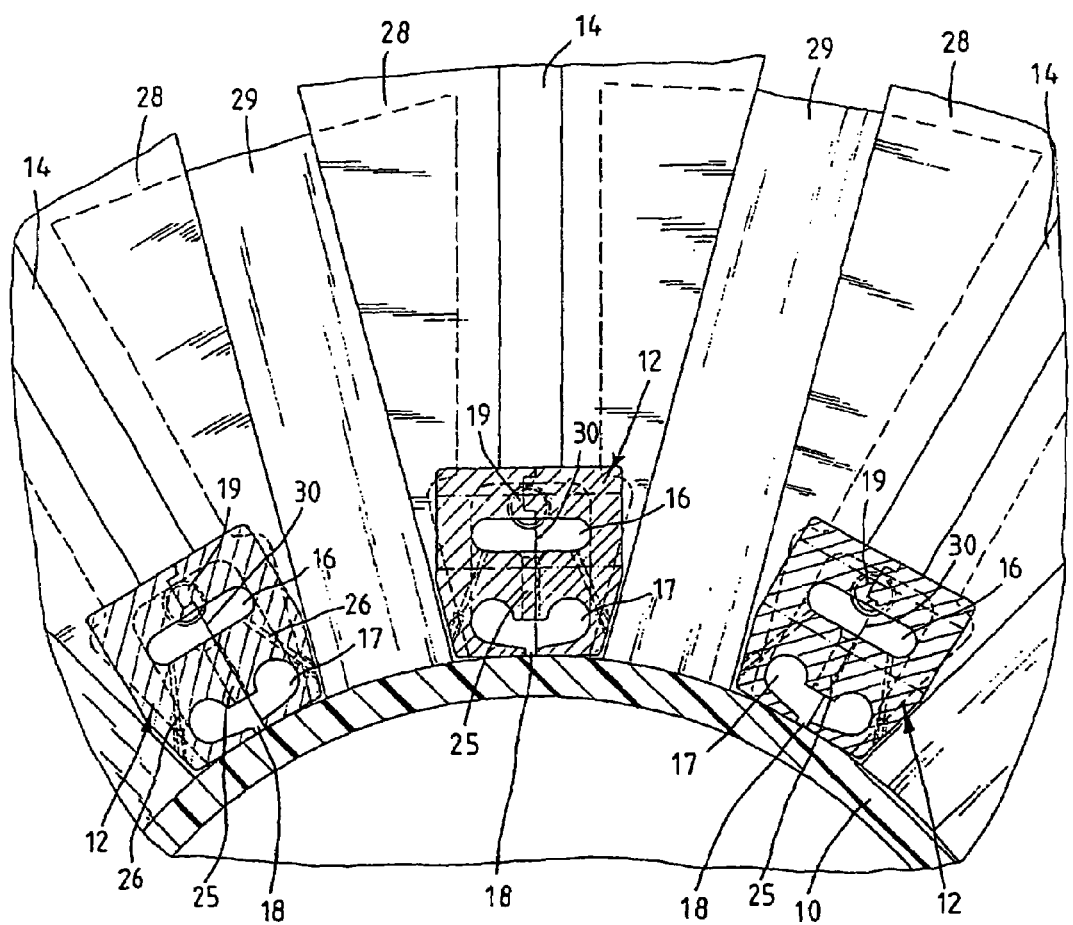
FIG. 5 is a diagrammatic illustration in a production direction of the pipe on a calibrating strip, with the associated diaphragms.

FIG. 5 shows a section through the calibrating strip 12, where the water feed 19 as well as the recesses 16 and 17 and also the passages 25, connecting the two recesses 16 and 17, and the outlet opening 18, with which the calibrating strip 12 bears against the outside of the tube 10, can be seen.

Here, the calibrating strip 12 firmly carries a diaphragm 28, which interacts with another diaphragm 29, which in the exemplary embodiment shown lies behind the diaphragm 28. The diaphragms 28 of the calibrating strips therefore form a first surface and the diaphragms 29 form a second diaphragm surface, the first and second surfaces bearing against one another and, if need be even sprayed with water, seal off the calibrating basket from the interior of the vacuum calibrating bath 4.

The calibrating strips have side walls and water passages 26. The water passages 26 extend from the recess 16 and open out above the sliding surface 15 in the side walls of the calibrating strip 12.

I claim:

1. A calibrating basket for a calibrating station in an apparatus for producing plastic pipes, the calibrating basket comprising:

adjusting spindles; and calibrating tools disposed successively at a distance from one another over a circumference of a pipe, said calibrating tools include calibrating strips extending in a longitudinal direction of the pipe to be calibrated, said calibrating strips disposed on said adjusting spindles in a radially adjustable manner, said calibrating strips each having a sliding surface with an outlet opening formed therein and coming into contact with the pipe, said calibrating strips each having recesses formed inside said calibrating strips, said recesses being connected to said outlet opening in said sliding surface and running along a longitudinal axis of a respective calibrating strip, a second recess of said recesses is for connecting to a vacuum source; and a pressure-tight annular space, said calibrating strips disposed in said pressure-tight annular space.

2. The calibrating basket according to claim 1, further comprising a water feed connected to a first recess of said recesses.

3. The calibrating basket according to claim 1, wherein said second recess is connected to a vacuum of a vacuum calibrating bath.

4. The calibrating basket according to claim 1, wherein a vacuum or positive pressure can be set in said pressure-tight annular space.

5. The calibrating basket according to claim 4, wherein said pressure-tight annular space is connected to a vacuum of a vacuum suction or pressure bell.

6. The calibrating basket according to claim 1, wherein a lower vacuum can be set in said pressure-tight annular space than in said second recess.

7. The calibrating basket according to claim 1, wherein said calibrating strips having passages formed therein and said recesses are connected to one another through said passages.

8. The calibrating basket according to claim 2, wherein said calibrating strips have side walls and water passages formed therein, said water passages connected to said first recess and open out above said sliding surface in said side walls of said calibrating strip.

9. The calibrating basket according to claim 1, wherein the calibrating basket is to be rotatably mounted in the calibrating station and set in rotation about the pipe.

10. The calibrating basket according to claim 1, wherein said outlet opening is a continuous slot or a formation of successive bores.

11. The apparatus according to claim 9, wherein:

said calibrating strips each having an access opening formed therein; and the calibrating station has an inlet side connected to a vacuum or positive pressure prevailing in a vacuum or suction bell and the calibration station being sealed off at another end from a vacuum prevailing in a vacuum calibrating bath, one of said recesses in each of said calibrating strips connected to the vacuum calibrating bath through said access opening.

12. The calibrating basket according to claim 1, wherein said calibrating strips each have a pressure-regulating bore formed therein fluidically communicating with said second recess.

13. The calibrating basket according to claim 11, wherein said calibrating basket has a diaphragm seal for sealing off said calibrating basket from an interior of the vacuum calibrating bath through said diaphragm seal, said diaphragm seal is formed from overlapping diaphragms, one of said diaphragms being firmly connected to said respective calibrating strip.

14. An apparatus for producing plastic pipes, comprising a calibrating basket containing:

adjusting spindles;

calibrating tools disposed successively at a distance from one another over a circumference of a pipe, said calibrating tools include calibrating strips extending in a longitudinal direction of the pipe to be calibrated, said calibrating strips disposed on said adjusting spindles in a radially adjustable manner, said calibrating strips each having a sliding surface with an outlet opening formed therein and coming into contact with the pipe, said calibrating strips each having recesses formed inside said calibrating strip, said recesses being connected to said outlet opening in said sliding surface and running in a longitudinal axis direction of a respective calibrating strip, a second recess of said recesses is for connecting to a vacuum source;

a pressure-tight annular space, said calibrating strips disposed in said pressure-tight annular space; and a calibration station, said calibrating basket rotatably mounted in said calibrating station and being set in rotation about the pipe.

15. The apparatus according to claim 14, wherein:

said calibrating strips each having an access opening formed therein; and said calibrating station has an inlet side connected to a vacuum or positive pressure prevailing in a vacuum or suction bell and said calibration station being sealed off at another end from a vacuum prevailing in a vacuum calibrating bath, one of said recesses in each of said calibrating strips is to be connected to the vacuum calibrating bath through said access opening.

16. The calibrating basket according to claim 15, wherein said calibrating basket has a diaphragm seal for sealing off said calibrating basket from an interior of the vacuum calibrating bath through said diaphragm seal, said diaphragm seal is formed from overlapping diaphragms, one of said diaphragms being firmly connected to said respective calibrating strip.

* * * * *